United States Patent [19]
Kudoh et al.

[11] Patent Number: 5,744,880
[45] Date of Patent: Apr. 28, 1998

[54] ROTATING MOTOR AND MOTOR-DRIVEN VEHICLE

[75] Inventors: Mitsuo Kudoh; Toshihiko Fukushima, both of Tsuchiura; Suetato Shibukawa, Hitachinaka; Osamu Koizumi; Fumio Tajima, both of Ibaraki-ken; Syouichi Kawamata, Hitachi; Rumi Minakata, Shizuoka-ken, all of Japan

[73] Assignee: Hitachi, Ltd., Tokyo, Japan

[21] Appl. No.: 668,266

[22] Filed: Jun. 20, 1996

[30] Foreign Application Priority Data

Jun. 20, 1995 [JP] Japan .................. 7-153352

[51] Int. Cl.⁶ .................. H02K 9/00; H02K 1/32
[52] U.S. Cl. .................. 310/58; 310/64
[58] Field of Search .................. 310/89, 90, 91, 310/54, 58, 59, 64, 65

[56] References Cited

U.S. PATENT DOCUMENTS

| | | | |
|---|---|---|---|
| 3,497,737 | 2/1970 | Philofsky | 310/54 |
| 4,350,908 | 9/1982 | Riffe | 310/61 |
| 4,514,652 | 4/1985 | Olson | 310/54 |
| 4,818,906 | 4/1989 | Kitamura et al. | 310/58 |
| 4,870,307 | 9/1989 | Kitamura et al. | 310/54 |
| 5,223,757 | 6/1993 | Staub et al. | 310/54 |
| 5,317,224 | 5/1994 | Ragaly | 310/58 |
| 5,488,118 | 1/1996 | Nakamura et al. | 310/54 |

FOREIGN PATENT DOCUMENTS

| | | |
|---|---|---|
| 61-72063 | 5/1986 | Japan . |
| 63-29365 | 2/1988 | Japan . |

*Primary Examiner*—Steven L. Stephan
*Assistant Examiner*—Michael J. Wallace, Jr.
*Attorney, Agent, or Firm*—Antonelli, Terry, Stout, & Kraus, LLP

[57] ABSTRACT

A rotating motor is provided which permits heat to be efficiently dissipated from all of the stator, rotor, and inner and outer races of bearings. This assures that the rotor exhibits a high intensity as it turns. Also, long bearing life is assured. A coolant enters a cooling passage formed in a first end bracket from entrance pipes and makes a half revolution, thus cooling a first one of the bearings. Also, the coolant cools the rotor via cooling disks and rotor disks. Then, the coolant flows into an outer surface-cooling passage in a motor housing and takes a zigzag course so as to make a substantially half revolution, thus cooling the stator. The coolant then flows into a cooling passage in a second end bracket and makes one revolution, thus cooling a second bearing. At the same time, the rotor is cooled via the cooling disks and rotor disks. Subsequently, the coolant enters another outer surface-cooling passage and makes a substantially half revolution, thus cooling the stator. The coolant then flows into another cooling passage in the aforementioned first end bracket and makes a substantially half revolution, thus cooling the first bearing again. Also, the rotor is cooled via the cooling disks and rotor disks.

19 Claims, 10 Drawing Sheets

ROTATING MOTOR AND MOTOR-DRIVEN VEHICLE

BACKGROUND OF THE INVENTION

The present invention relates to a sealed type rotating motor having a sealed housing and, more particularly, to a rotating motor equipped with mechanisms for cooling the heat-generating portions of the motor and also to a motor-driven vehicle using such a rotating motor.

In recent years, sealed type rotating motors having excellent dustproofness and waterproofness have been frequently used to drive various machines and apparatus. Well-known techniques associated with this sealed type rotating motor are described in Japanese Utility Model Laid-Open Nos. 29365/1988 and 72063/1986.

The technique described in the above-cited Japanese Utility Model Laid-Open No. 29365/1988 is shown in FIG. 15, where a sealed type rotating motor comprises a sealed case, a rotor 54, and a stator 56. The case is composed of a cylindrical frame 51 and end brackets 52L and 52R connected to respective open ends of the frame 51. Both ends of the rotor 54 are supported to the end brackets 52L and 52R, respectively, via bearings 53L and 53R, respectively. The stator 56 is disposed around the rotor 54, and a stator coil 55 is wound on the stator 56. Both ends of the rotor 54 opposing the end brackets 52L and 52R are equipped with rotor fins 57L and 57R, respectively. Heat-dissipating fins 58L and 58R are mounted on the inner surfaces of the end brackets 52L and 52R, respectively, and are located opposite to the rotor fins 57L and 57R, respectively.

In this structure, when a given electrical current is passed through the stator coil 55, a rotating magnetic field is produced. This magnetic field rotates the rotor 56 and a rotating shaft 59. At this time, both stator coil 55 and rotor coil (not shown) generate heat. The heat generated by the stator coil 55 is transmitted directly to the frame 51. The heat produced by the rotor coil is transmitted to the end brackets 52L and 52R largely via the rotor fins 57L, 57R and the heat-dissipating fins 58L, 58R. Finally, the heat is dissipated to the ambient air through the frame 51 and the end brackets 52L, 52R, thus air-cooling the motor.

A sealed type rotating motor described in the above-cited Japanese Utility Model Laid-Open No. 72063/1986 is shown in FIG. 16. This motor is similar to the motor shown in FIG. 15 except that cooling water passages 73 and 74 are formed around a stator 71 and around a bearing 72, respectively. Heat generated by a stator coil 75 is dissipated by cooling water flowing around the stator 71. Heat generated by a rotor coil 77 of a rotor 76 is transmitted to the stator 71 via a space between the rotor 76 and the stator 71. This heat is then removed by cooling water flowing around the stator 71 in the same way as the above-described heat.

These well-known techniques have the following problems. In the arrangement such as shown in FIG. 15, heat dissipated to the ambient air from the frame 51 and the end brackets 52L, 52R undergoes a high resistance and so if the load on the rotating motor increases, the frame 51 and the end brackets 52L, 52R are overheated. This in turn overheats the bearings 53L and 53R (especially their outer races) held to the end brackets 52L and 52R, respectively. As a consequence, the life of the bearings shortens, and sticking or the like occurs. As a result, the operation may be hindered.

In the arrangement such as shown in FIG. 16, the rotor 76 is cooled via the stator 71 which gets considerably hot. Therefore, it is impossible to make the temperature of the rotor 76 lower than the temperature of the stator 71. Consequently, sufficient cooling is not accomplished. Therefore, if the load on the rotating motor increases, the rotor 76 overheats. This deteriorates the strengths of the iron core and the conductor of the rotor 76 as they turn. As a result, the rotor conductor may break. Where the rotating motor is a dc machine, the insulation may deteriorate.

Furthermore, as the temperature of the rotor 76 is elevated as described above, the inner race of the bearing 72 which is thermally in communication with the rotor 76 via a rotating shaft 78 is overheated. Where the machine is run under a high-load condition, if the amount of heat generated by the rotor 76 is large, the inner race of the bearing 72 is overheated and may be thermally expanded. Since the outer race of the bearing 72 is water-cooled by the cooling water flowing around the bearing 72, the difference in thermal expansion between the inner and outer races of the bearing 72 reduces the radial gap between the inner and outer races. This shortens the lifetime of the bearing. Thus, sticking or the like is induced. As a result, the operation of the machine is hindered.

SUMMARY OF THE INVENTION

It is an object of the present invention to provide a rotating motor which has a stator, a rotor, and bearings equipped with outer and inner races and which permits heat to be efficiently dissipated from all of the stator, rotor, and races of the bearings, thus securing sufficient rotor strength and satisfactory bearing lifetime.

It is another object of the invention to provide a motor-driven vehicle using the rotating motor described in the immediately preceding paragraph.

One of the above objects is achieved in accordance with the teachings of the invention by a rotating motor comprising: a rotating shaft having an outer surface, which shaft is capable of rotating about an axis of rotation; a rotor fixedly mounted to the outer surface of the rotating shaft and having an outer surface and a winding, the rotor having opposite ends in a direction of the axis of rotation; a stator disposed around the rotor and having an outer surface and a winding; a frame mounted on the outer surface of the stator; end brackets by which both ends of the rotating shaft are rotatably held via bearings; a case in which the rotor and the stator are housed; stator-cooling mechanisms provided with coolant passages for cooling the stator; and rotor-cooling mechanisms disposed close to at least one of the opposite ends of the rotor and provided with coolant passages for cooling the rotor.

One of the above objects is achieved in accordance with the teachings of the invention by a rotating motor comprising: a rotating shaft having an outer surface, which shaft is capable of rotating about an axis of rotation; a rotor fixedly mounted on the outer surface of the rotating shaft and having an outer surface and a winding, said rotor having opposite ends in a direction of the axis of rotation; a stator disposed around the rotor and having a winding; a frame mounted on the outer surface of the stator; end brackets by which both ends of the rotating shaft are rotatably held via bearings; a case in which the rotor and the stator are housed; stator-cooling mechanisms provided with coolant passages for cooling the stator; bearing-cooling mechanisms mounted in the end brackets and provided with coolant passages for cooling the bearings; and rotor-cooling mechanisms disposed close to at least one of said opposite ends of the rotor and provided with coolant passages for cooling the rotor.

In any one of the above-described rotating motors, the rotor-cooling mechanisms are preferably mounted in the end brackets, respectively.

In any one of the above-described rotating motors, in the position of at least one of said opposite ends of the rotor taken in the direction of the axis of rotation there are preferably provided substantially annular rotor disks to be cooled. The rotor-cooling mechanisms are equipped with a substantially annular cooling disks disposed opposite to the rotor disks in the direction of the axis of rotation.

In any one of the above-described rotating motors, said rotor disks are preferably mounted in or on the end rings of the rotor.

In any one of the above-described rotating motors, said rotor disks are preferably formed integrally with the end rings of the rotor.

In any one of the above-described rotating motors, said rotor disks are preferably firmly mounted on the end rings of the rotor.

In any one of the above-described rotating motors, the vertical cross-sectional shapes of the cooling surfaces of the cooling disks and of the cooled surfaces of the rotor disks taken in the direction of the axis of rotation are preferably protruding and recessed portions which are opposite to each other.

In any one of the above-described rotating motors, the vertical cross-sectional shapes of the cooling surfaces of the cooling disks and of the cooled surfaces of the rotor disks taken in the direction of the axis of rotation are preferably substantially saw-toothed portions which are opposite to each other.

In any one of the above-described rotating motors, the cooling surfaces of the cooling disks are preferably radially opposite to the cooled surfaces of the rotor disks outside the cooled surfaces.

In any one of the above-described rotating motors, said rotor disks are preferably firmly mounted on the rotating shaft.

In any one of the above-described rotating motors, said cooling disks and said rotor disks are preferably made of a metal having a high coefficient of thermal expansion.

In any one of the above-described rotating motors, said material having a high coefficient of thermal expansion preferably includes at least one of aluminum and copper.

In any one of the above-described rotating motors, said coolant passages in the stator-cooling mechanisms are preferably formed in the frame of the motor. An iron core included in the stator and said winding of the stator are integrally encased in a molding member that fills in a space between the outer surface of the stator and the inner surface of the frame.

In any one of the above-described rotating motors, said molding member is preferably made of a resin having a high coefficient of thermal expansion.

In any one of the above-described rotating motors, the coolant passages in the stator-cooling mechanisms and the coolant passages in the rotor-cooling mechanisms are preferably connected to each other and permit a common coolant to flow therethrough.

In any one of the above-described rotating motors, the coolant passages in the stator-cooling mechanisms, the coolant passages in the bearing-cooling mechanisms, and the coolant passages in the rotor-cooling mechanisms are preferably connected to each other and permit a common coolant to flow therethrough.

In any one of the above-described rotating motors, said common coolant is preferably supplied into supply ports formed in the coolant passages in the rotor-cooling mechanisms.

In any one of the above-described rotating motors, said common coolant is preferably supplied into supply ports formed in the coolant passages in the stator-cooling mechanisms.

In order to achieve one of the above-described objects, a motor-driven vehicle equipped with any one of the above-described rotating motors is provided.

In the present invention, a given electrical current is passed through the stator winding of any one of the rotating motors described above to produce a rotating magnetic field. This magnetic field rotates the rotating shaft and the rotor. The stator winding and the rotor winding are caused to generate heat. Heat generated by the stator winding is dissipated into the coolant in the stator-cooling mechanisms mounted, for example, in the motor frame. Heat generated by the rotor winding is dissipated into the coolant in the rotor-cooling mechanisms which are disposed close to at least one of the axial ends of the rotor, the rotor-cooling mechanisms being disposed, for example, in the end brackets.

In the prior art technique, heat generated by the rotor is dissipated via the stator. Unlike the prior art technique, in accordance with the present invention, heat is efficiently dissipated from the rotor, thus preventing the motor from overheating; otherwise the intensity of the material of the rotor would deteriorate, thus deteriorating the intensities of the iron core and the conductors, as they rotate, and the insulating characteristics. This enhances the reliability. Furthermore, it is unlikely that heat generated by the rotor overheats the stator.

Since the rotor is cooled by the rotor-cooling mechanisms used only for the rotor, the bearings, especially their outer races, held to the end brackets are prevented from being overheated, unlike the prior art technique where heat from the rotor is transmitted to the end brackets via rotor fins and heat-dissipating fins. Since a rise in temperature of the rotor can be prevented, the bearings, especially their inner races, which are thermally in communication with the rotor via the rotating shaft are prevented from overheating. Therefore, the life of the bearings is prevented from being shortened. Also, sticking is prevented.

Also, in accordance with the present invention, a given electrical current is passed through the stator winding to produce a rotating magnetic field. This rotates the rotating shaft and the rotor. As a result, the stator winding and rotor winding produce heat. At this time, heat generated by the stator winding is dissipated into the coolant in the stator-cooling mechanisms mounted, for example, in the frame. Heat generated by the rotor winding is dissipated into the coolant in the rotor-cooling mechanisms which are disposed in the end brackets and close to at least one of the axial ends of the rotor.

Unlike the prior art technique where heat from the rotor is dissipated via the stator, heat is efficiently dissipated from the rotor, thus preventing the machine from overheating; otherwise the intensity of the material of the rotor would deteriorate, thus deteriorating the intensities of the iron core and the conductors, as they rotate, and the insulating characteristics. This enhances the reliability. Furthermore, it is unlikely that heat generated by the rotor overheats the stator.

Since the rotor is cooled by the rotor-cooling mechanisms used only for the rotor, the bearings, especially their outer races, held to the end brackets are prevented from being overheated, unlike the prior art technique where heat from the rotor is transmitted to the end brackets via rotor fins and heat-dissipating fins. Since a rise in temperature of the rotor can be prevented, the bearings, especially their inner races, which are thermally in communication with the rotor via the rotating shaft, are prevented from overheating. Therefore, the life of the bearings is prevented from being shortened. Also, sticking is prevented.

The end brackets are equipped with the bearing-cooling mechanisms to forcedly cool the bearings. As a result, heat transmitted from the rotor via the rotating shaft and heat generated by the bearings due to mechanical loss are dissipated into the coolant in the bearing-cooling mechanisms. At this time, the outer races of the bearings are more strongly cooled by the bearing-cooling mechanisms. Since the rotor is sufficiently cooled by the rotor-cooling mechanisms, the amount of heat transmitted from the rotor to the inner races of the bearings is reduced. Hence, a variation in the radial gap which would otherwise be created by the difference in coefficient of thermal expansion between the inner and outer races of the bearings can be sufficiently prevented. This further assures that the lifetime of the bearings is prevented from being shortened.

A substantially annular rotor disk to be cooled is mounted in the position of at least one of the opposite ends in the direction of the axis of rotation. That is, the rotor disks are formed integrally with end rings, respectively. Alternatively, the rotor disks are firmly mounted on the end rings, respectively. Substantially annular cooling disks are mounted in the rotor-cooling mechanisms, respectively, and are located opposite to the rotor disks, respectively, in the direction of the axis of rotation. Therefore, heat generated by the winding of the rotor is transmitted to the cooling disks via the rotor disks, respectively. Hence, the rotor can be cooled by the coolant in the coolant passages close to the rotor.

Vertical cross-sectional shapes of the cooling surfaces of the cooling disks and of the cooled surfaces of the rotor disks taken in the direction of the axis of rotation are substantially saw-toothed portions which are opposite to each other. This increases the areas of the cooling disks and the areas of the cooled surfaces of the rotor disks. That is, the heat transfer area is increased. This can further improve the cooling effect.

Vertical cross-sectional shapes of the cooling surfaces of the cooling disks and of the cooled surfaces of the rotor disks taken in the direction of the axis of rotation are substantially saw-toothed portions which are opposite to each other. Thus, Greater allowances can be given to displacements of the rotor in the direction of the axis of rotation and in the radial direction, while maintaining the gap between the cooling surfaces and the cooled surfaces at the minimum value which can maximize the transfer of heat. As a consequence, the machine is regulated against displacements of the rotor.

The cooling surfaces of the cooling disks are placed in an opposite relation to the cooled surfaces in the radial direction outside the cooled surfaces of the rotor disks. Therefore, the adjustment of the gap between the cooling surfaces of the cooling disks and the cooled surfaces of the rotor disks is required to be made only in the radial direction. As a consequence, the dimensional accuracy can be enhanced with greater ease than where axial adjustments must be made.

The rotor disks are firmly mounted to the rotating shaft. Heat transmitted from the rotor to the bearings via the rotating shaft can be blocked by the rotor disks and so the temperature of the bearings can be further lowered. Since the rotor disks, which are separate members, are mounted on the rotating shaft during assembly, the components of the rotor excluding the rotor disks can be made common to every rotating motor. Only the specifications of the rotor disks need be varied according to the rated load of the rotating motor. Hence, the productivity can be enhanced.

Where the cooling disks and the rotor disks are made of a metal having a high coefficient of thermal expansion, such as aluminum or copper, the rotor can be cooled more efficiently.

Where the stator core and the stator winding mounted in the stator are integrally encased in a molding member consisting, for example, of a resin having a high coefficient of thermal expansion, such that the molding member fills in the space between the outer surface of the stator and the inner surface of the motor housing, a transfer of heat generated by the stator winding can be transferred to the frame more efficiently. This can further improve the dissipation of heat by means of the stator-cooling mechanisms.

Where the coolant passages in the stator-cooling mechanisms and the coolant passages in the rotor-cooling mechanisms are connected to each other and permit flow of a common coolant therethrough, the single coolant can cool both stator and rotor.

Where the coolant passages in the stator-cooling mechanisms, the bearing-cooling mechanisms, and the rotor-cooling mechanisms are connected to each other and permit flow of a common coolant therethrough, the single coolant can cool all of the stator, the bearings in the end brackets, and the rotor.

Where supply ports into which the common coolant is supplied are formed in the coolant passages in the rotor-cooling mechanisms, the coolest coolant is supplied into the rotor-cooling mechanisms. Hence, the rotor can be cooled more strongly.

Where the supply ports into which the common coolant is supplied are formed in the coolant passages in the stator-cooling mechanisms, the coolant first cools the stator in the coolant passages in the stator-cooling mechanisms mounted, for example, in the frame. Then, the coolant is supplied into the coolant passages in the bearing-cooling mechanisms mounted in the end brackets. This prevents the bearings, especially their outer races, from being overcooled, which in turn assures that the radial spacing between the inner races and the outer races of the bearings is prevented from decreasing.

Other objects and features of the invention will appear in the course of the description thereof, which follows.

DETAILED DESCRIPTION OF THE PREFERRED EMBODIMENTS

Figure 1:
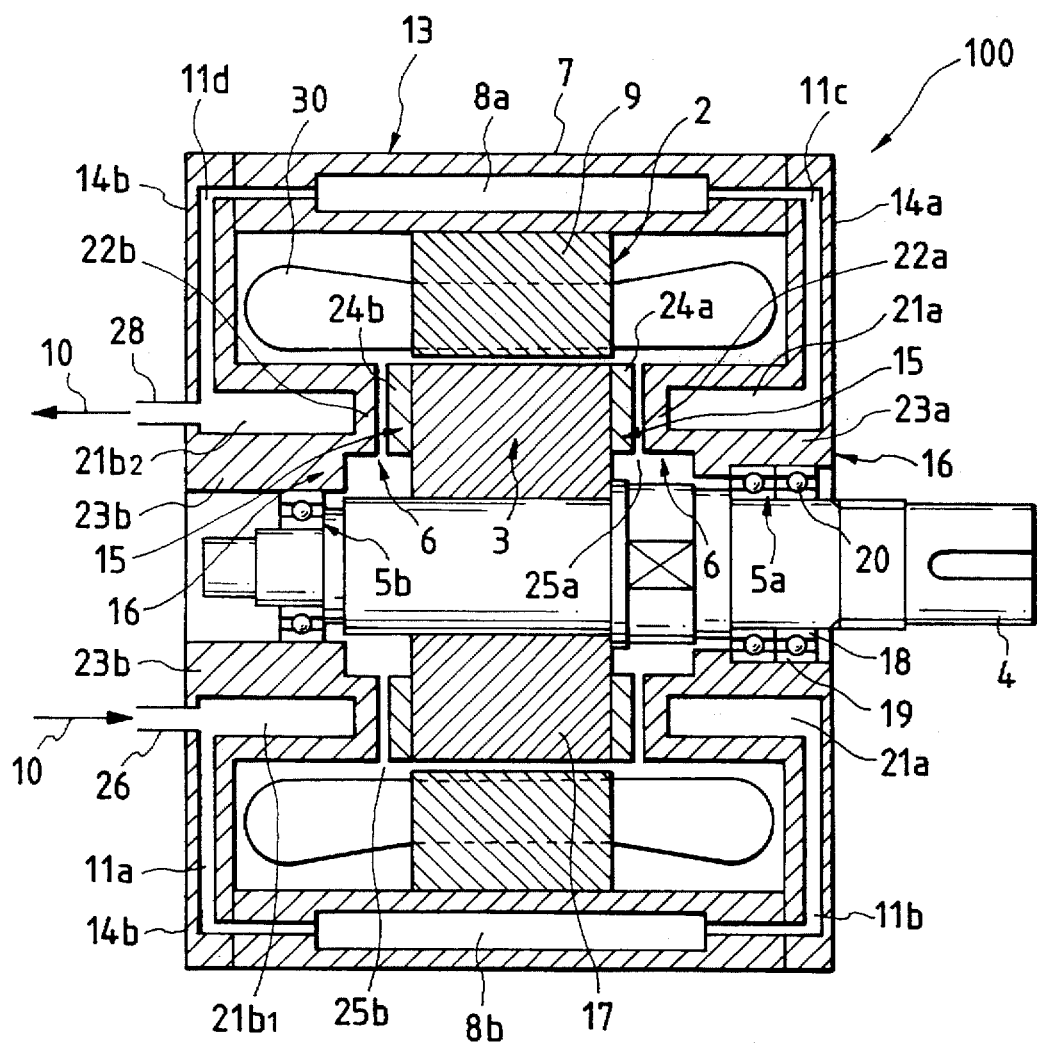
FIG. 1 is a vertical cross section of a rotating motor according to the invention, showing the whole structure.
Figure 2:
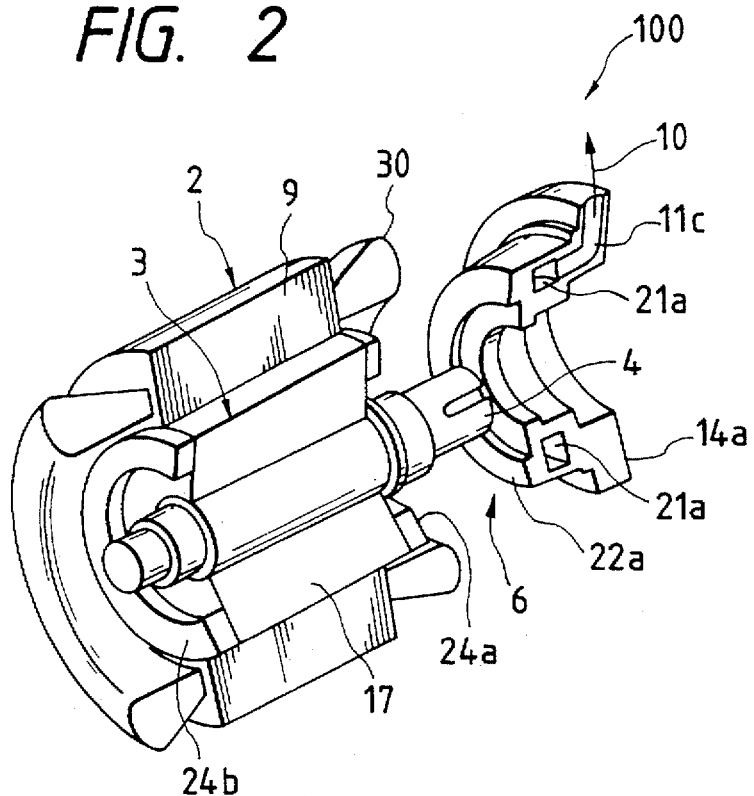
FIG. 2 is a partially cutaway perspective view of an assembly of a rotor, a stator, and end brackets shown in FIG. 1.
Figure 3:
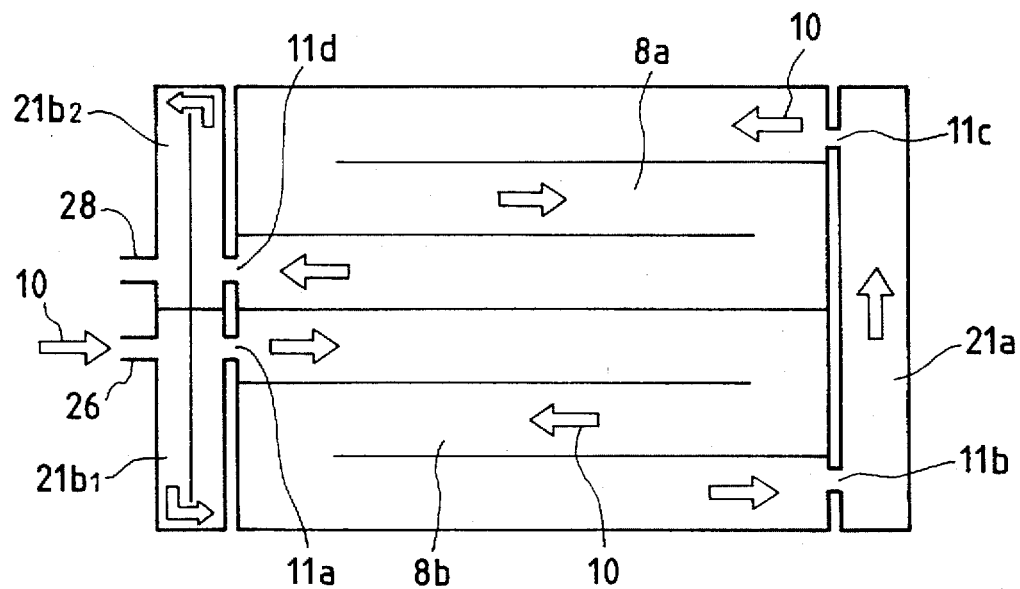
FIG. 3 is a pictorial view illustrating the flow of a coolant in the rotating motor shown in FIG. 1.

Referring to FIGS. 1–3, there is shown a sealed type variable-speed, rotating motor according to the invention. This motor is driven, for example, by an inverter. This rotating motor is generally indicated by reference numeral 100. The whole structure of the motor 100 is shown in FIG. 1. The motor 100 has an assembly of a rotor, a stator, and end brackets. This assembly is shown in FIG. 2.

In FIGS. 1 and 2, the rotating motor 100 consists mainly of a rotating shaft 4, the rotor, indicated generally by numeral 3, the stator, indicated generally by numeral 2, a case 1, stator-cooling mechanisms 13 using a cooling liquid, and rotor-cooling mechanisms 6 also using the cooling liquid and mounted in the end brackets 14a and 14b, respectively. The rotor 3 is mounted on the outer surface of the rotating shaft 4, and has a rotor core 17 and a squirrel-cage winding (not shown) made of copper, for example. The stator 2 is disposed around the rotor 3, and has a stator core 9 and a stator winding 30 made of copper, for example. The case 1 comprises a motor housing 7 and the end brackets 14a and 14b. The motor housing 7 is disposed around the stator 2. Both ends of the rotating shaft 4 are rotatably held by the end brackets 14a and 14b via bearings 5a and 5b, respectively. The rotor 3 and the stator 2 are housed in the case 1. The stator-cooling mechanisms 13 are formed in the motor housing 7 and are provided with outer surface-cooling passages 8 for passing a coolant therethrough to cool the stator 2. The rotor-cooling mechanisms 6 are disposed close to both ends of the rotor 3 and are equipped with cooling passages 21 for passing the coolant therethrough to cool the rotor 3.

The cooling passages 21 in the rotor-cooling mechanisms 6 are adjacent to the bearings 5a and 5b, respectively, with bearing housings 23a and 23b therebetween. The bearing housings 23a and 23b are mounted in the centers of the end brackets 14a and 14b, respectively, and are surrounded by the cooling passages 21, respectively. That is, the cooling passages 21 act also as coolant passages in bearing-cooling mechanisms 16.

The iron core 9 of the stator 2 is fixedly mounted to the inner surface of the motor housing 7. A polyphase winding is wound on this core 9 to form the stator winding 30. The motor housing 7 is provided with a given number of cooling passages 8a, 8b for cooling the outer surface. These cooling passages extend axially of the motor.

Both ends of conductors are connected to each other via end rings 15 to form the squirrel-cage winding (not shown) of the rotor 3. These components, the rotor core 17, and the rotating shaft 4 are firmly coupled together. Each of the bearings 5a and 5b supporting the rotating shaft 4 is composed of an inner race 18, an outer race 19, and balls 20. The bearings 5a and 5b are fitted and held in the bearing housings 23a and 23b, respectively.

Substantially annular rotor disks 24a and 24b which should be cooled are formed integrally with the ends of the end rings 15 of the rotor 3. The rotor-cooling mechanisms 6 mounted in the end brackets 14a and 14b, respectively, are equipped with cooling disks 22a and 22b disposed opposite to the rotor disks 24a and 24b, respectively. The cooling disks 22a and 22b assume the form of a tube and are to be cooled. The cooling disks 22a and 22b are substantially parallel to the rotor disks 24a and 24b and are closely spaced from the rotor disks 24a and 24b, respectively. A narrow space 25a exists between the cooling disk 22a and the rotor disk 24a. Similarly, a narrow space 25b is present between the cooling disk 22b and the rotor disk 24b.

The length $\delta$ of these spaces 25a and 25b is preferably set to about 0.1–0.6 mm. The cooling disks 22a, 22b and the rotor disks 24a, 24b are made of a metal having a high coefficient of thermal expansion, such as aluminum, copper, or an alloy including at least one of them.

One of the cooling passages 21 in the rotor-cooling mechanisms 6 is located in the end bracket 14a and forms a cooling passageway 21a which extends radially so as to make substantially one revolution in the end bracket 14a. The other of the cooling passages 21 is located in the end bracket 14b and forms cooling passageways $21b_1$ and $21b_2$ which are spaced from each other. Each of these cooling passageways $21b_1$ and $21b_2$ makes a substantially half revolution in the end bracket 14b.

The outer surface-cooling passage 8 in each stator-cooling mechanism 13 comprises outer surface-cooling passageways 8a and 8b. The passageway 8b connects the cooling passageway $21b_1$ in one of the rotor-cooling mechanisms 6 with the cooling passageway 21a. The passageway 8a connects the cooling passageway 21a in the other rotor-cooling mechanism 6 with the cooling passageway $21b_2$.

A plurality of axially extending holes are formed in the motor housing 7 and are connected together in a zigzag fashion via a header, thus forming the outer surface-cooling passageways 8a and 8b. As a result, each of these passageways extends radially around the stator 2 and makes a substantially half revolution. Of these passageways, the outer surface-cooling passageway 8b is connected with the cooling passageways $21b_1$ and 21a via connecting passages 11a and 11b. The outer surface-cooling passageway 8a is connected with the cooling passageways 21a and $21b_2$ via connecting passages 11c and 11d.

The flow of the coolant through the stator-cooling mechanisms 13 and through the rotor-cooling mechanisms 6 next will be described with reference to FIG. 3, which conceptually illustrates the manner in which the coolant flows.

In FIGS. 1, 2, and 3, the coolant (such as cooling water) 10 flows into the cooling passageway $21b_1$ from an entrance pipe 26 mounted in one end bracket 14b. Then, the coolant makes a substantially half revolution within the cooling passageway $21b_1$. At this time, the coolant cools the bearing 5b via the bearing housing 23b and, at the same time, cools the rotor 3 from the left as viewed in FIG. 1 via the cooling disk 22b, the space 25b, and the rotor disk 24b.

Subsequently, the coolant 10 passes through the connecting passage 11a and enters the outer surface-cooling passageway 8b in the motor housing 7. The coolant then takes a zigzag course and makes a substantially half revolution around the stator 2, thus cooling the lower half of the stator 2 as viewed in FIG. 1.

Thereafter, the coolant 10 flows through the connecting passage 11b and enters the cooling passageway 21a formed in the other end bracket 14a. The liquid makes substantially one revolution, thus cooling the bearing 5a via the bearing housing 23a. At the same time, the coolant cools the rotor 3 from the right as viewed in FIG. 1 via the cooling disk 22a, the space 25a, and the rotor disk 24a.

Then, the coolant 10 flows into the outer surface-cooling passageway 8a in the motor housing 7 through the connecting passage 11c. The coolant again takes a zigzag course and makes a substantially half revolution around the stator 2, thus cooling the upper half of the stator 2 as viewed in FIG. 1.

The coolant 10 flows via the connecting passage 11d into the cooling passageway $21b_2$ formed in the end bracket 14b. As the coolant makes a substantially half revolution, the coolant again cools the bearing 5b via the bearing housing 23b. At the same time, the coolant cools the rotor 3 from the left as viewed in FIG. 1 via the cooling disk 22b, space 25b, and rotor disk 24b. Then, the coolant flows out from an exit pipe 28.

The operation of the rotating motor 100 constructed as described above next will be described. When an alternating current of a given frequency is supplied from an inverter driver (not shown) to the rotating motor 100 (in the present example, an induction motor), the current flows through the stator winding 30. The resistance of the winding 30 of the stator produces Joule heat.

At the same time, a rotating magnetic field is developed in synchronism with the operating frequency of the inverter. This magnetic field induces an electrical current in the squirrel-cage winding of the rotor 3. The induced current produces an electromagnetic force, which in turn acts on the rotor 3 to thereby rotate the rotor 3 and the rotating shaft 4. The current induced in the squirrel-cage winding produces Joule heat due to the resistance of the winding.

The heat generated by the stator 2 is dissipated into the coolant flowing through the outer surface-cooling passageways 8a and 8b via the motor housing 7 in which the stator 2 is secured, the passageways 8a and 8b being formed in the stator-cooling mechanisms 13. Therefore, a rise of the temperature of the stator 2 is suppressed.

Most of the heat generated by the rotor 3 is transmitted from the rotor disks 24a and 24b to the cooling disks 22a and 22b of the rotor-cooling mechanisms 6 via the spaces 25a and 25b in a noncontacting and direct manner. Thus, the heat is exchanged between the case and the rotor. The heat is dissipated into the coolant in the cooling passages 21a, $21b_1$, and $21b_2$. As a consequence, a rise of the temperature of the rotor 3 is suppressed. As a result, heat is efficiently dissipated from the rotor 3 to prevent overheating, unlike the technique described in the above-cited Japanese Utility Model Laid-Open No. 29365/1988, where heat from the rotor is dissipated via the stator. This assures that the material of the core 17 of the rotor (such as silicon steel lamination) and the material of the squirrel-cage winding (such as copper or aluminum) show satisfactory strengths. Hence, the strength of the machine, especially the strength obtained when the machine is run at a high speed under a high-load condition, is improved.

An insulator coating is formed on the surface of the rotor core 17. This insulator coating would normally be deteriorated by high temperatures. This deterioration is alleviated by the novel structure. Similarly, the insulator coating on the surface of the stator core 9 is less deteriorated by high temperatures. Consequently, the reliability is improved. A part of the heat generated by the rotor 3 is transmitted to the stator 2. Since this part is reduced, a rise of the temperature of the stator 2 is suppressed greatly.

Because the rotor 3 is cooled by the rotor-cooling mechanisms 6 so as to suppress a rise of the temperature as described above, the bearings 5a and 5b (especially their outer races 19) held to the end brackets 14a and 14b, respectively, are prevented from overheating, unlike the well-known technique described in the above-cited Japanese Utility Model Laid-Open No. 72063/1986, where heat from the rotor is transmitted to the end brackets via the rotor fins and heat-dissipating fins. Furthermore, the coolant in the cooling passages 21a, $21b_1$, $21b_2$ in the rotor-cooling mechanisms 6 removes the heat transmitted from the rotor 3 via the rotating shaft 4, as well as the heat generated inside the bearings 5a and 5b due to mechanical loss. As a consequence, rise of the temperature of the bearings 5a and 5b is suppressed. Hence, the temperature is kept low.

Where an increase in the temperatures of the bearings 5a and 5b and of the rotor 3 are suppressed in this way, the temperature difference between the rotor 3 and the bearings 5a, 5b is, of course, small. This reduces the amount of heat Q transmitted from the rotor 3 to the bearings 5a and 5b via the rotating shaft 4.

Let R be the resistance of the bearings 5a and 5b to heat. When the amount of heat Q flows through the bearings 5a and 5b, the temperature difference between the inner race 18 and the outer race 19 of each bearing is given by $$(T1-T2)=Q/R \tag{1}$$

where T1 is the temperature of the inner race of the bearing and T2 is the temperature of the outer race.

That is, as the amount of heat Q decreases, the temperature difference (T1-T2) between the inner race 18 and the outer race 19 of each bearing can be reduced. Consequently, the radial gaps in the bearings 5a and 5b vary only a little. Thus, the life of the bearings is prevented from shortening. Also, sticking and other undesirable phenomena can be prevented.

In the above-described rotating motor 100, the stator-cooling mechanisms 13 are formed integrally with the motor housing 7. Since the purpose is to cool the stator, it is not always necessary to form the stator-cooling mechanisms 13 integrally with the motor housing 7. For example, holes for passing a cooling medium may be formed in the stator. Also, in this case, similar advantages can be obtained.

Another rotating motor according to the present invention next will be described by referring to FIGS. 4–7. This rotating motor is similar to the rotating motor already described in connection with FIGS. 1–3 except that the cooling surfaces of the cooling disks and the cooled surfaces of the rotor disks have different shapes. It is to be noted that like components are indicated by like reference numerals in the various figures.

This rotating motor is generally indicated by reference numeral 200. Rotor-cooling mechanisms 206 are incorporated as main parts in the rotating motor 200, and the vicinities of the rotor-cooling mechanisms 206 are particularly shown in FIG. 4. The assembly of the rotor, stator, and end brackets is shown in FIG. 5, which corresponds to FIG. 2.

Figure 4:
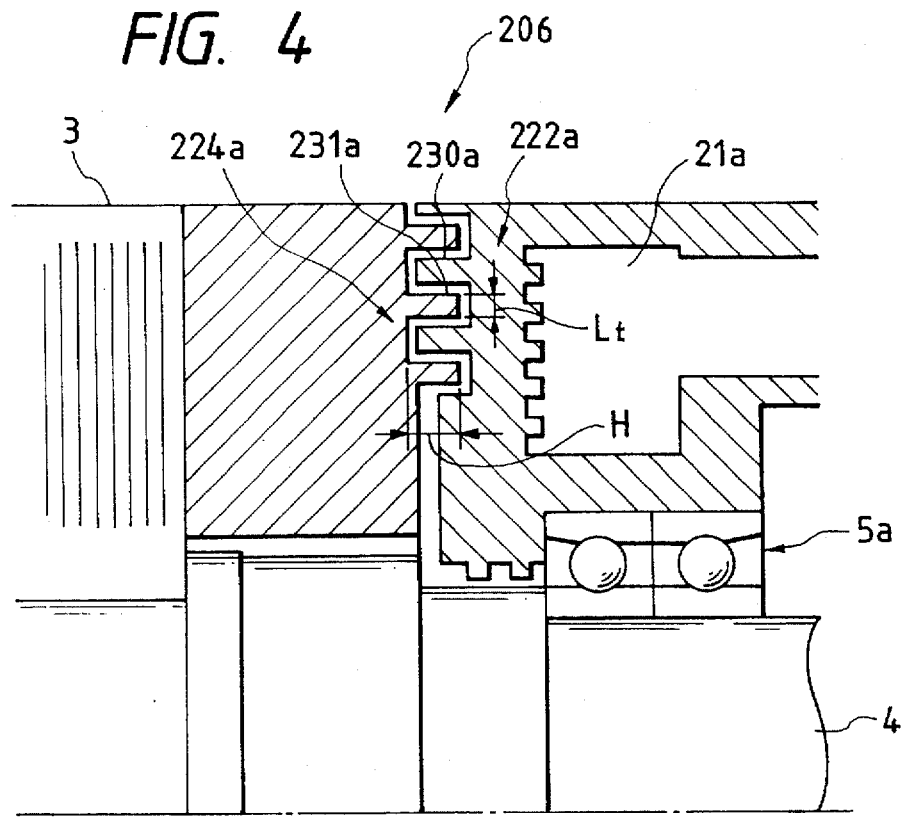
FIG. 4 is a vertical cross section of the vicinities of the rotor-cooling mechanisms incorporated as main parts in another rotating motor according to the invention.
Figure 5:
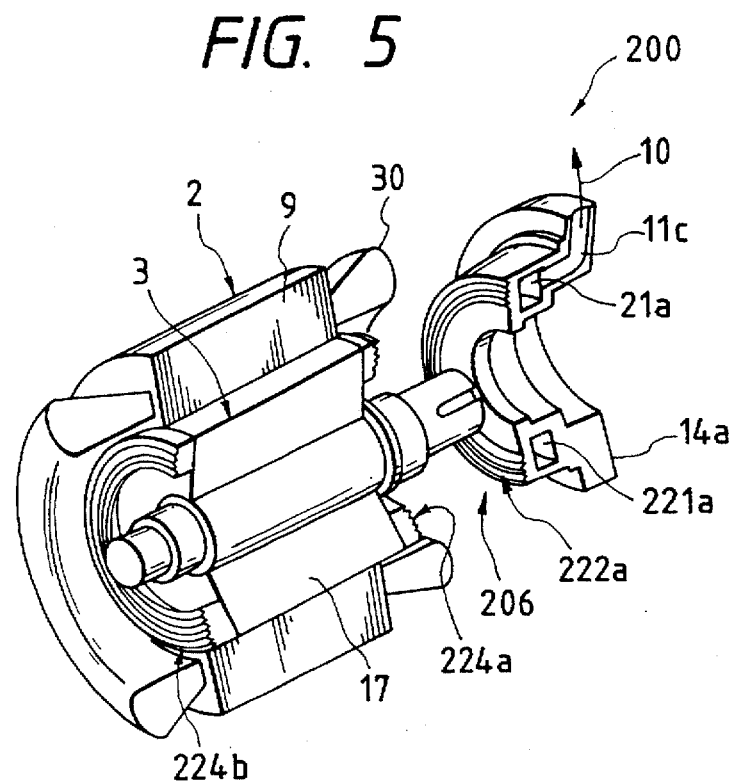
FIG. 5 is a partially cutaway perspective view of an assembly of a rotor, a stator, and end brackets shown in FIG. 4.

In FIGS. 4 and 5, the rotating motor 200 of the present embodiment differs from the rotating motor 100 of the first-mentioned embodiment in that the vertical cross-sectional shapes of the cooling surfaces 230a and 230b (not shown) of cooling disks 222a and 222b (not shown), respectively, and cooled surfaces 231a and 231b (not shown) of rotor disks 224a and 224b form rectangular fins which are opposite to each other.

The rotating motor 200 of the present embodiment yields the same advantages as produced by the rotating motor of the first-mentioned embodiment. In addition, the areas of the cooling surfaces 230a and 230b of the cooling disks 222a and 222b and the areas of the cooled surfaces 231a and 231b of the rotor disks 224a and 224b can be increased. That is, the areas used for transfer of heat can be increased. Hence, the cooling effect can be enhanced further. This will be described in further detail below.

Figure 6A:
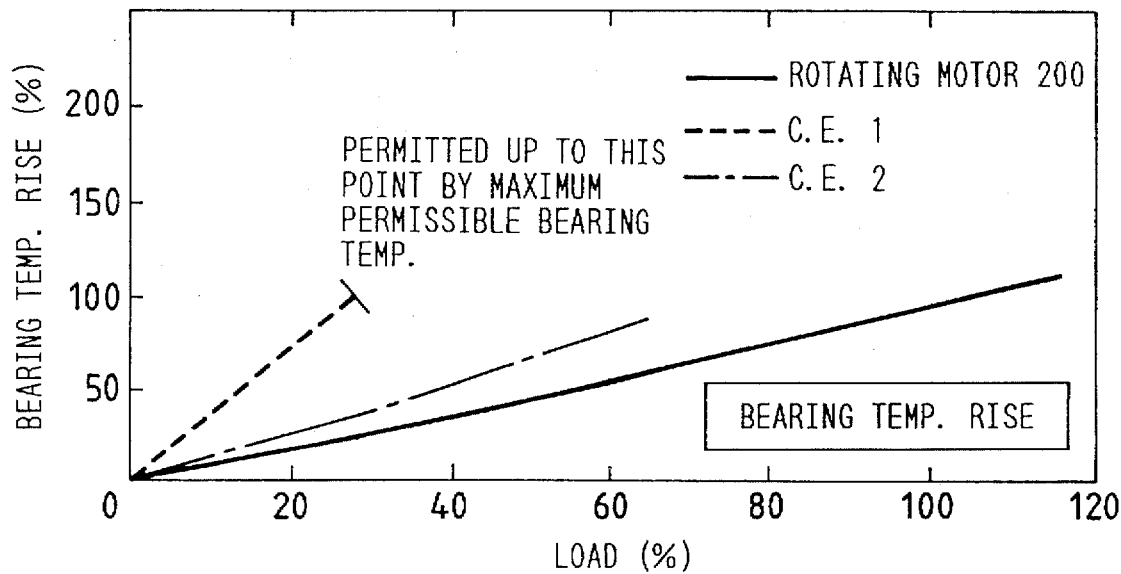
FIG. 6 is a graph illustrating the lowered temperature of the rotor and the lowered temperature of the bearings in the rotating motor shown in FIG. 4.
Figure 6B:
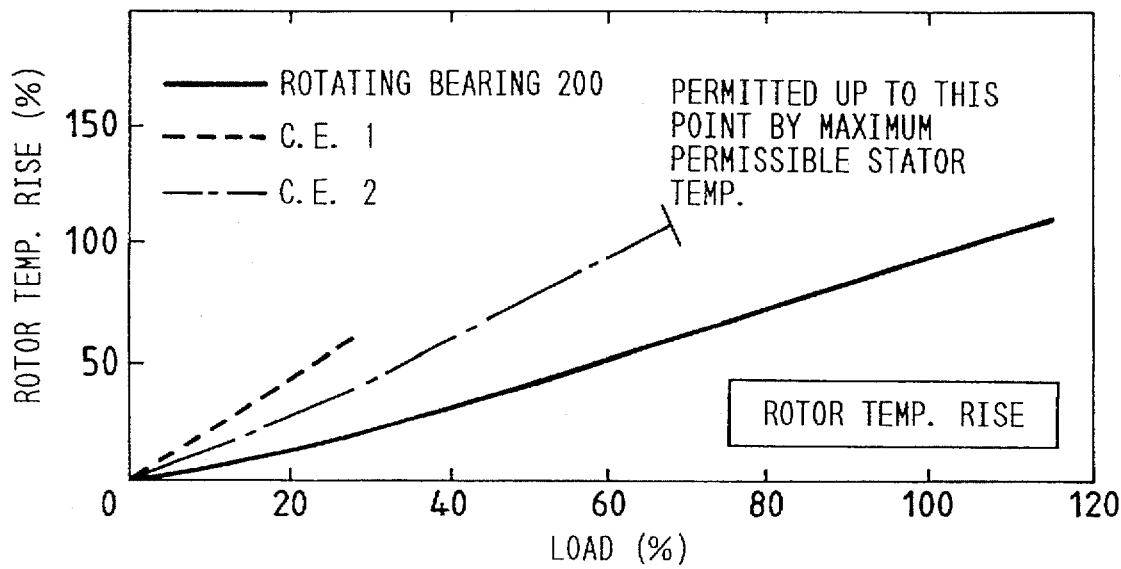
Figure 7:
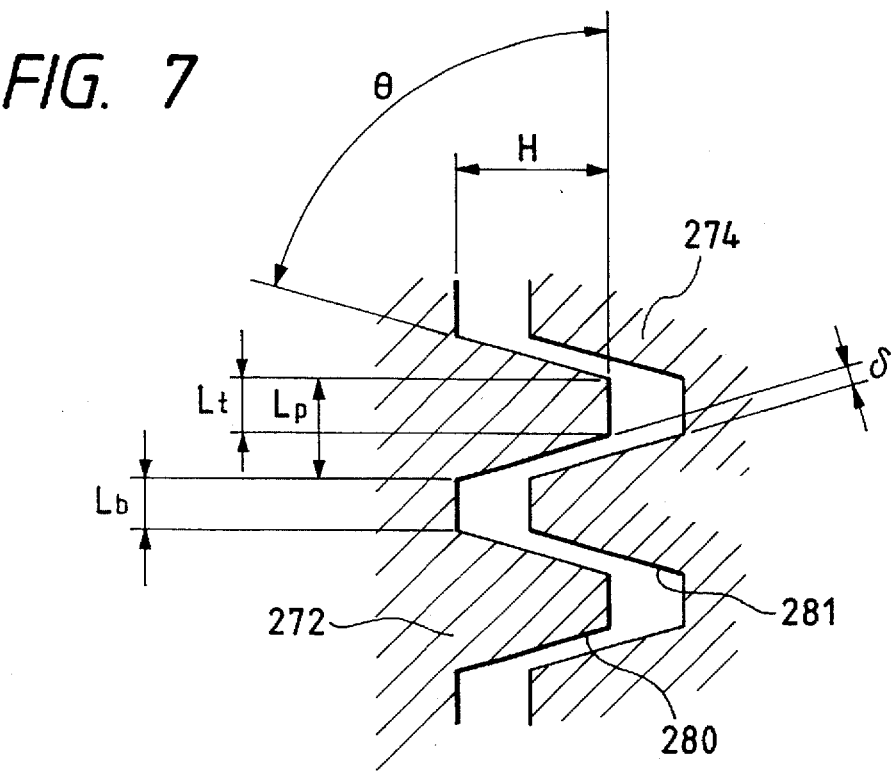
FIG. 7 is a vertical cross section of cooling disks and rotor disks incorporated in a modification of the rotating motor shown in FIG. 4, particularly showing the shapes of the cooling surfaces of the cooling disks and the shapes of the cooled surfaces of the rotor disks.

The rotor-cooling effect and the bearing-cooling effect of the present embodiment are illustrated in FIG. 6. The percentage of temperature rise is plotted on the vertical axis, taking the maximum permissible level to be 100%. The load is plotted on the horizontal axis, assuming that the rated output is 100%.

The rotating motor 200 is a small-sized, high-output motor having the following specifications: a rated output of 30 kW, a rated rotational frequency of 3060 rpm, and a total weight of about 40 kg. The rotor 3 has a diameter of 110 mm and an axial length of 100 mm. The cooling disks 222a, 222b and the rotor disks 224a, 224b have an outside diameter of 110 mm. The fins have a height H of 6 mm. The width Lt of the teeth measured at their tops is 1.7 mm. The minimum gap δ between the successive teeth is 0.25 mm.

Figure 15:
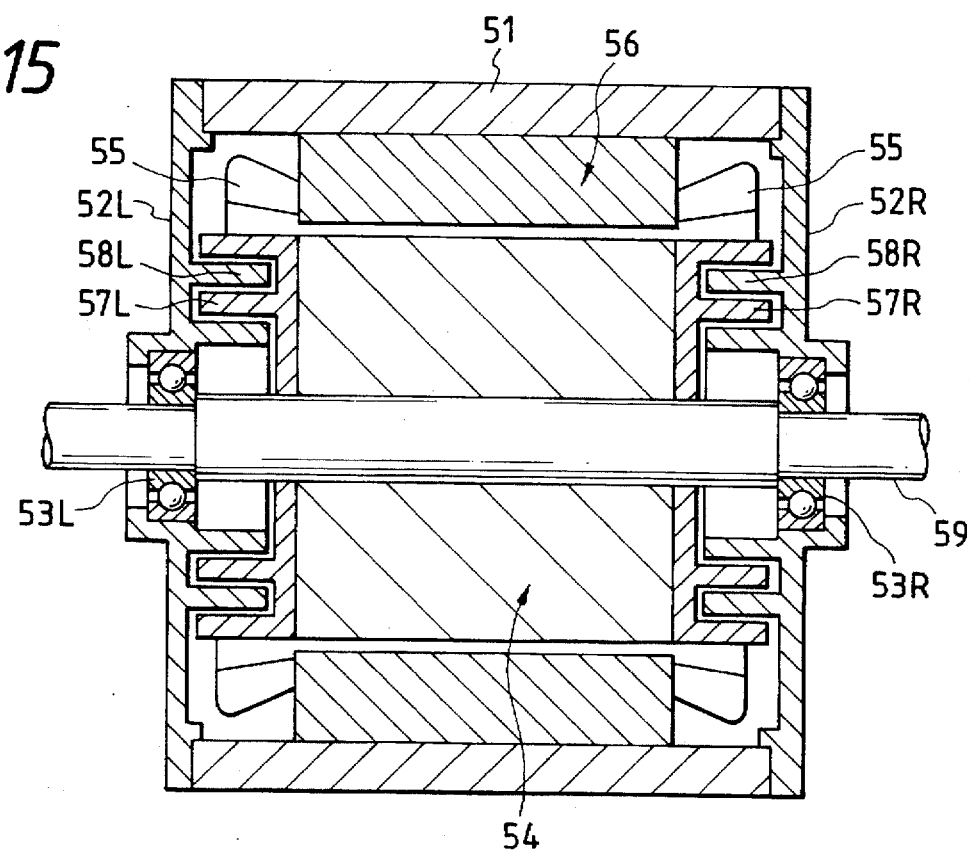
FIG. 15 is a vertical cross section of a well-known rotating motor, showing its whole structure.
Figure 16:
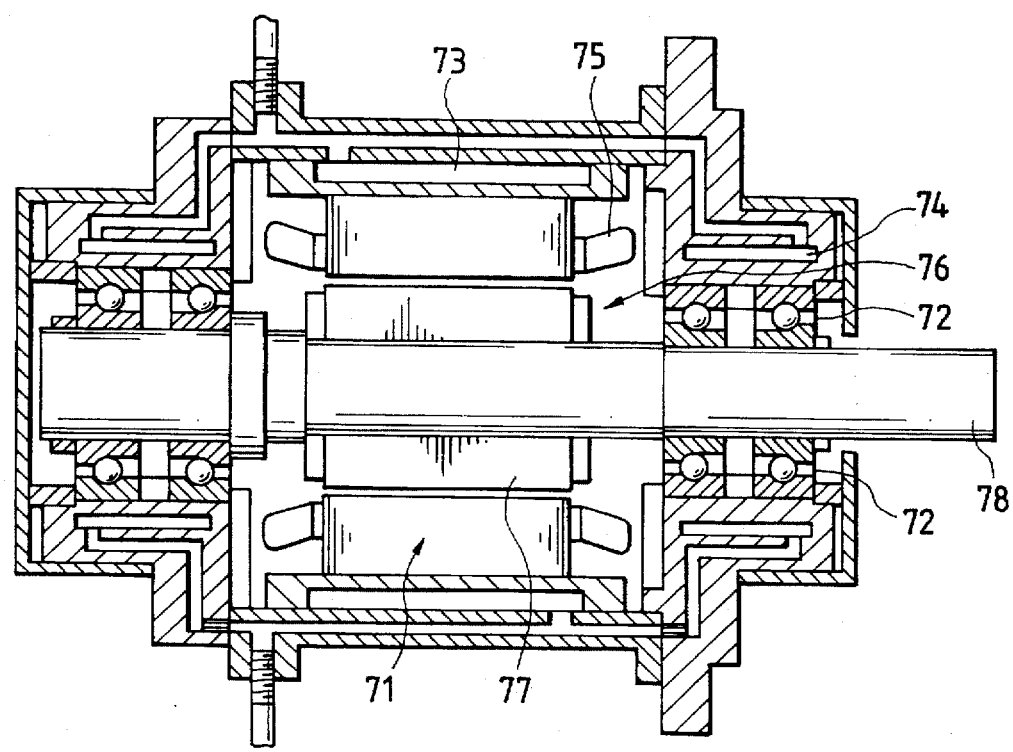
FIG. 16 is a vertical cross section of another well-known rotating motor, showing its whole structure.

For comparison, the structure described in the above-cited Japanese Utility Model Laid-Open No. 29365/1988 (shown in FIG. 15) and the structure described in the above-cited Japanese Utility Model Laid-Open No. 72063/1986 (shown in FIG. 16) were used, and obtained results are shown as Comparative Examples 1 and 2 (abbreviated as C.E. 1 and C.E. 2, respectively) in the same graph.

In FIG. 6, in Comparative Example 1, the rotor fins are disposed close to the bearing housing. The temperature of the bearing housing is elevated by heat transmitted from the rotor. For these reasons, the temperature of the bearing is elevated rapidly. It can be seen that the operation can no longer be continued when the load reaches about 30%. In Comparative Example 2, the bearing is forcedly cooled and so the rise of the temperature of the bearing is milder than in Comparative Example 1. However, as the load is increased, the temperature of the rotor is elevated rapidly, because the rotor is not cooled. It can be seen that the operation can no longer be continued when the load reaches about 60%.

On the other hand, in the rotating motor 200 of the present embodiment, the temperature rises more mildly as a whole. A high-load operation is permitted up to a load of about 120%. This proves that the rotor-cooling mechanisms 206 effectively cool down the bearings and the rotor. Accordingly, for the same output power, the size or weight of the rotating motor can be reduced. This leads to a decrease in the fabrication cost.

In the above embodiment described in conjunction with FIGS. 4–7, the fins of the cooling surfaces 230a of the cooling disks 222a, 222b and the fins of the cooled surfaces 231a, 231b (not shown) of the rotor disks 224a, 224b are rectangular in shape. The fins are not limited to this shape. A modified example next will be described by referring to FIG. 7.

In this modified example, a cooling disk 272 has a cooling surface 280, and a rotor disk 274 has a cooled surface 281. The shapes of the cooling surface 280 and cooled surface 281 are particularly shown in FIG. 7. The cooling surface 280 and the cooled surface 281 have alternately protruding fins in the shape of isogonal trapezoids.

In this case, in order to prevent collision and damage during thermal expansion and assembly, it is desired that the tooth top width Lt and the tooth bottom width Lb satisfy the relation Lt≈Lb−2δ. Of course, the surface tilt angle θ, the tooth height H, and the tooth top pitch Lp can be set at will within the range θ=0° to 90°, taking account of the amount of heat to be removed by cooling, the diameter D of the rotor 3, and other factors. Because of compromises with the heat transfer performance and the productivity, it is desirable to set those factors such that H/D≈0 to 0.2 and Lp/D≈about 0.005 to 0.1.

The present modification yields the same advantages as obtained by the embodiment described already in connection with FIGS. 4–7. Additionally, the gap δ between the cooling surface 280 and the cooled surface 281 is maintained at a minimum value which maximizes heat transfer, in the same way as in the following embodiment. At the same time, large allowances are given to the displacements of the rotor in the direction of the rotating shaft and in the radial direction. Consequently, the machine is regulated against displacements of the rotor.

A further rotating motor according to the invention will be described by referring to FIGS. 8 and 9. This embodiment is similar to the embodiments already described in connection with FIGS. 1–7 except that the cooling surfaces of the cooling disks and the cooled surfaces of the rotor disks have different shapes.

Figure 8:
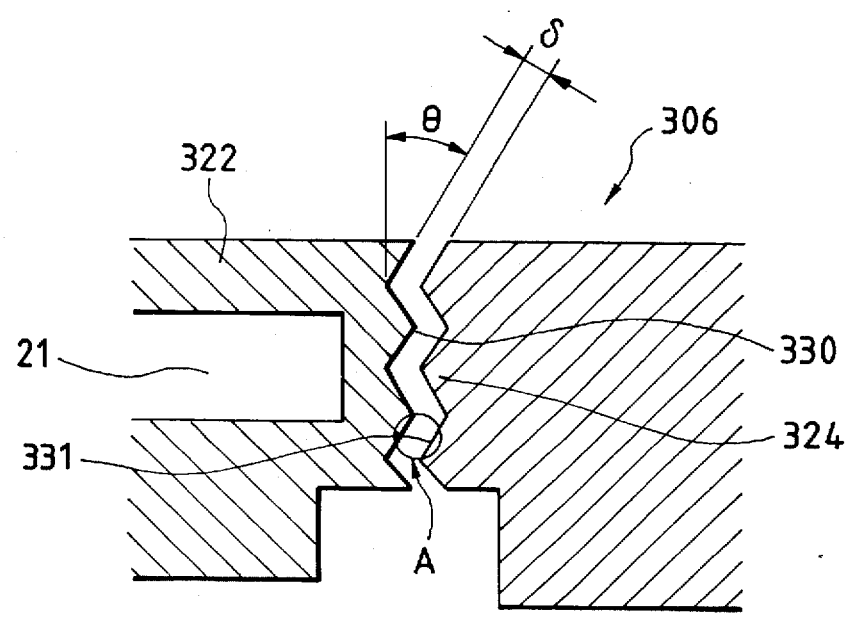
FIG. 8 is a vertical cross section of the vicinities of the rotor-cooling mechanisms incorporated as main parts in a further rotating motor according to the invention.

A rotor-cooling mechanism 306 is incorporated as a main part in the rotating motor of the present embodiment, and the vicinities of the rotor-cooling mechanism 306 are particularly shown in FIG. 8. The portion A of FIG. 8 is shown in the enlarged view of FIG. 9.

Figure 9:
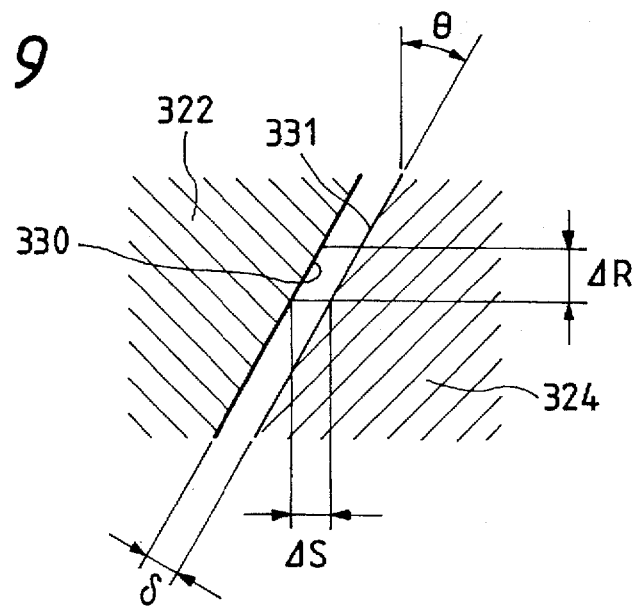
FIG. 9 is an enlarged view of portion A of FIG. 8.

Referring to FIGS. 8 and 9, the rotating motor of the present embodiment differs from the first-mentioned embodiment illustrated in FIGS. 1–3 in that the vertical cross-sectional shapes of the cooling surfaces 330 of the cooling disks 322 and of the cooled surfaces 331 of the rotor disks 324 assume substantially saw-toothed forms which are opposite to each other. In other words, the heat transfer surfaces take rotatable zigzag shapes.

In the present embodiment, increased heat transfer area improves the cooling effect in the same way as in the embodiment previously described in connection with FIGS. 4–7. This cooling effect is described in greater detail by referring to FIG. 9.

In FIGS. 8 and 9, it is assumed that the cooled surfaces 331 of the rotor disk 324 and the cooled surface 330 of the cooling disk 322 are tilted at an angle of θ to a plane which is perpendicular to the axis of rotation. Let δ be the minimum gap between them. The amount of heat Q transmitted from the rotor 3 to the cooling disk 322 via the rotor disk 324 is given by $$Q = C(\lambda/\delta) \bullet A \bullet \Delta T \qquad (2)$$

where ΔT is the temperature difference between the cooling surface 330 and the cooled surface 331, λ is the coefficient of thermal expansion of air, and C is an experimental coefficient.

In Eq. (2) above, A is the effective heat transfer area of the opposite surface. Letting Ab be the effective heat transfer area where the cooling surface 330 and the cooled surface 331 are flat (θ=0°), the effective heat transfer area is given by $$A = Ab/\cos\theta \qquad (3)$$

Accordingly, where the tilt angle θ lies within the range 0<θ<90°, the relationship cos θ<1 is obtained. Therefore, where the surfaces are tilted at an angle of θ, the effective heat transfer area A is made larger than where the cooling surface is flat (θ=0°).

In the present embodiment, the machine is regulated against displacements of the rotor in the same way as in the above-described modification of the embodiment illustrated in FIGS. 4–7.

More specifically, referring to FIG. 9, let ΔR be the radial distance between the cooled surface 331 of the rotor disk 324 and the cooled surface 330 of the cooling disk 322. Let ΔS be the axial distance between them. These distances are given by $$\Delta R = \delta/\sin\theta$$

$$\Delta S = \delta/\cos\theta \qquad (4)$$

Accordingly, where the tilt angle θ lies within the range 0<θ<90°, the relations sin θ<1 and cos θ<1 hold. It can be seen, therefore, that both ΔR and ΔS are greater than the minimum gap δ. That is, great allowances can be given to the displacements of the rotor 3 in the direction of the axis of rotation and in the radial direction while maintaining the gap δ between the cooling surface 330 and the cooled surface 331 at a minimum value which can maximize heat transfer. As a consequence, the machine is regulated against displacements of the rotor.

A yet other rotating motor according to the invention will be described by referring to FIG. 10. This embodiment is similar to the three embodiments already described in connection with FIGS. 1–9 except that the cooling surfaces of the cooling disks and the cooled surfaces of the rotor disks have different shapes.

Figure 10:
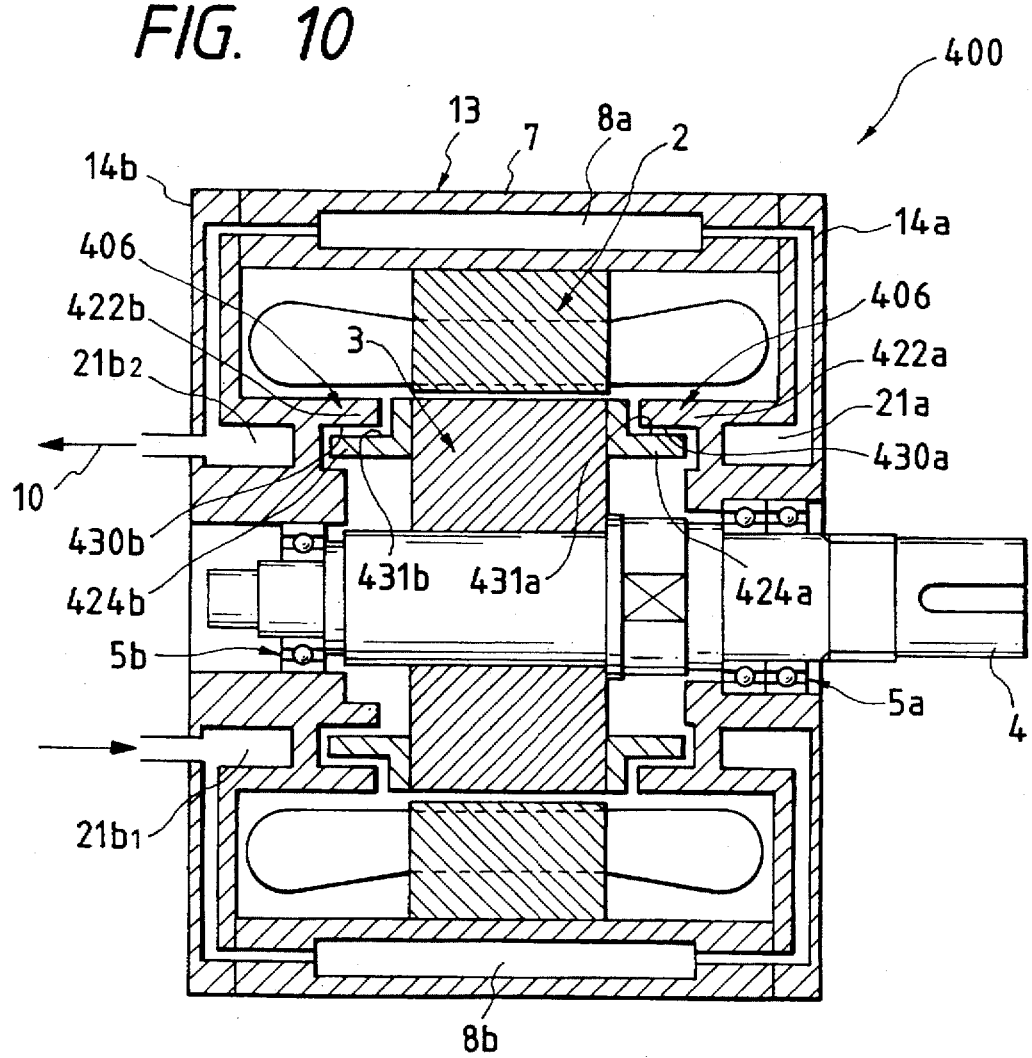
FIG. 10 is a vertical cross section of a yet another rotating motor according to the invention, showing the whole structure.

This rotating motor is generally indicated by reference numeral 400 in FIG. 10 which corresponds to FIG. 1 illustrating the first-mentioned embodiment.

In FIG. 10, the rotating motor 400 of the present embodiment is similar to the rotating motor 100 of the first-mentioned embodiment except that cooling surfaces 430a and 430b of cooling disks 422a and 422b of rotor-cooling mechanisms 406 are located outside cooled surfaces 431a and 431b of the rotor disks 424a and 424b, respectively, and positioned opposite to the cooling surfaces 431a and 431b, respectively, in the radial direction.

The present embodiment yields the same advantages as those derived by the first-mentioned embodiment. In addition, the gaps between the cooling surfaces 430a, 430b of the cooling disks 422a, 422b and the cooled surfaces 431a, 431b of the rotor disks 424a, 424b are only required to be adjusted radially. Consequently, the dimensional accuracy can be improved with greater accuracy than in a case where adjustments must be made axially. Hence, the productivity is enhanced.

A still other rotating motor according to the invention will be described by referring to FIG. 11. This embodiment is similar to the four embodiments already described in connection with FIGS. 1–10 except for the structure of the rotor.

Figure 11:
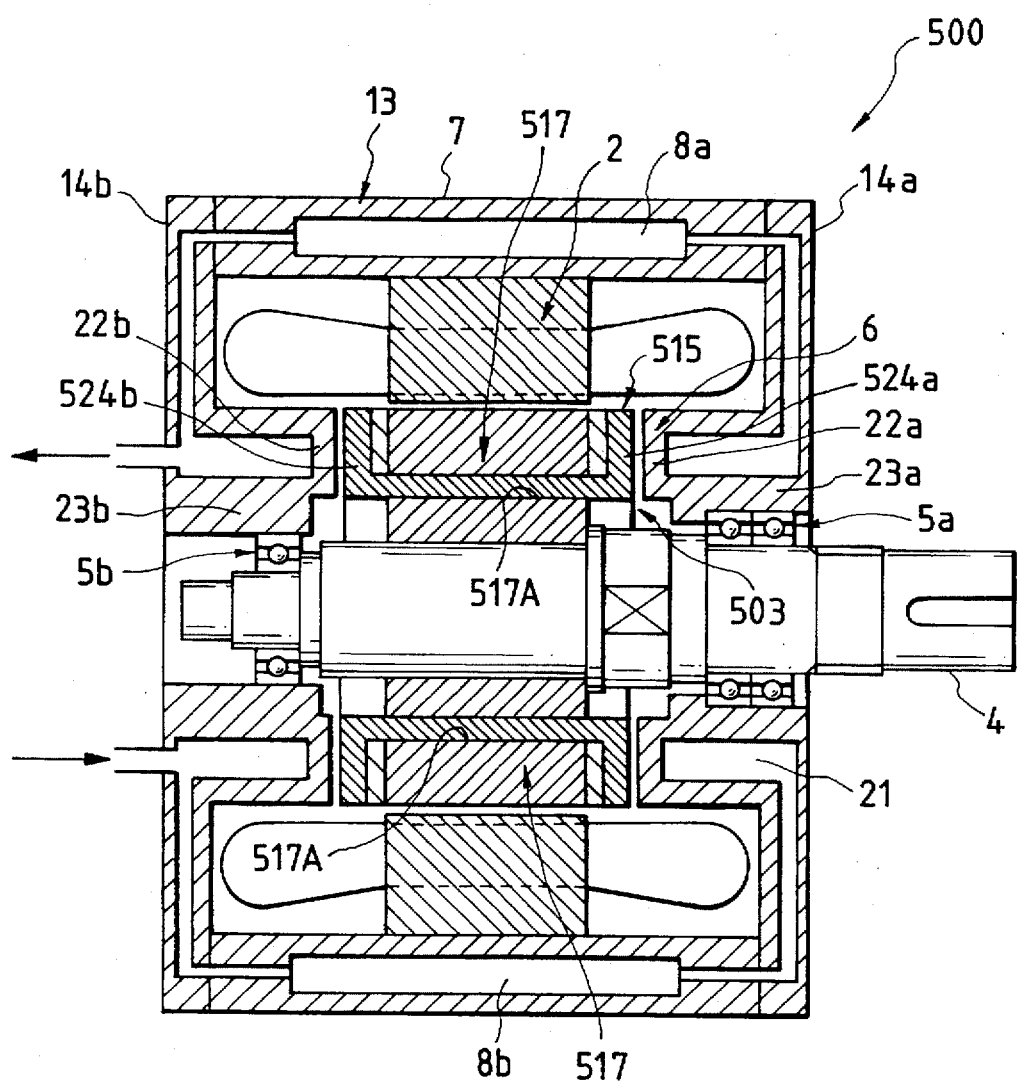
FIG. 11 is a vertical cross section of a still another rotating motor according to the invention, showing the whole structure.

The rotating motor of the present embodiment is generally indicated by numeral 500 in FIG. 11. This rotating motor 500 is similar to the rotating motor 100 of the first-mentioned embodiment except that rotor disks 524a and 524b are not formed integrally with end rings 515 but are firmly mounted on the end rings 515 after being formed independent of the end rings 515.

In particular, the rotor 503 has an iron core 517 provided with a plurality of holes 517A extending axially through the core. These holes 517A are spaced from each other in a direction perpendicular to the circumferential direction. Opposite ends of conductors are first connected together via the end rings 515 while leaving the holes 517A behind, thus forming a squirrel-cage winding (not shown). Then, the rotor disks 524a and 524b having an outside diameter close to that of the end rings 515 are die-cast from aluminum or otherwise formed in intimate contact with the ends of the end rings 515. The rotor disks 524a and 524b are coupled to each other through the holes 517A. The present embodiment yields the same advantages as derived by the first-mentioned embodiment.

A still further rotating motor according to the invention will be described by referring to FIG. 12. This embodiment is similar to the five embodiments described already except for the structure of the rotor disks.

Figure 12:
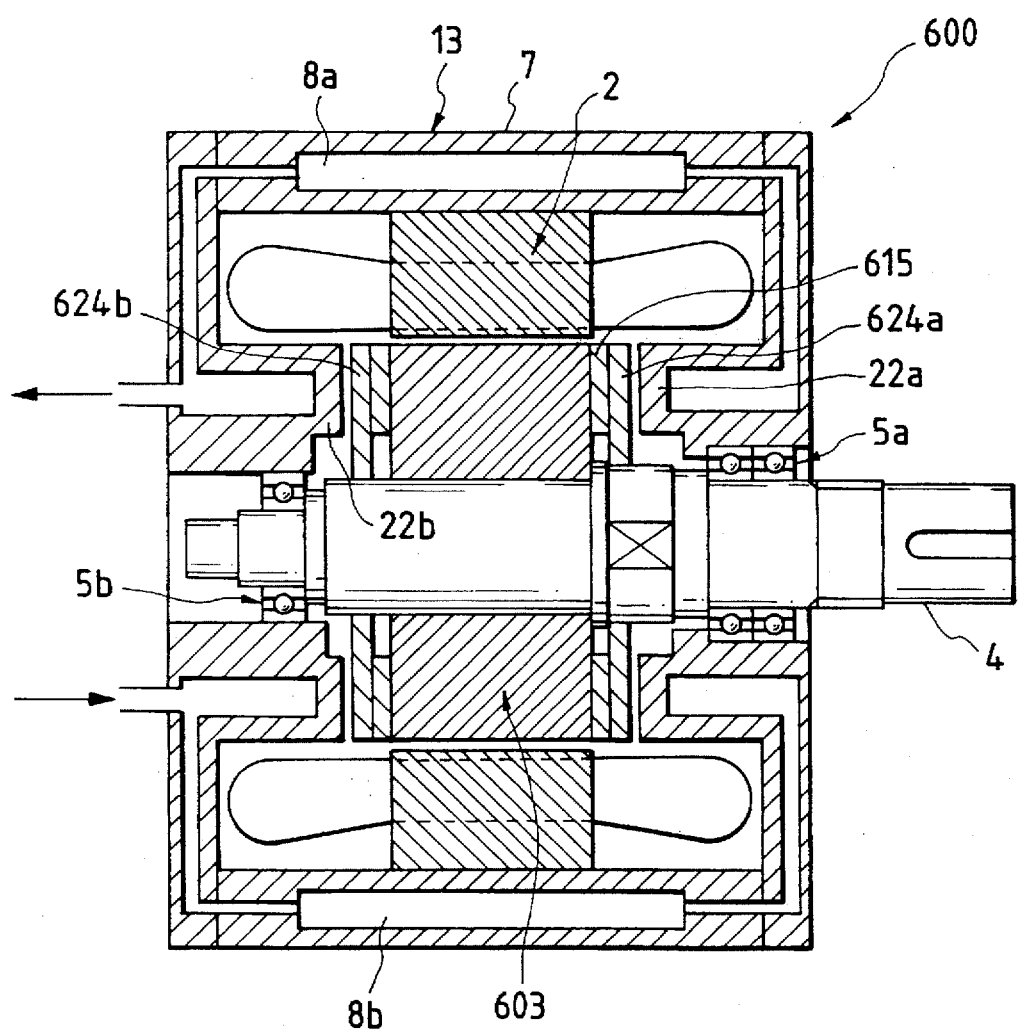
FIG. 12 is a vertical cross section of a yet a further rotating motor according to the invention, showing the whole structure.

This rotating motor is generally indicated by reference numeral 600 in FIG. 12. This rotating motor 600 is similar to the rotating motor 100 of the first-mentioned embodiment except that rotor disks 624a and 624b of a rotor 603 are not mounted on end rings 615, but are firmly bonded to the rotating shaft 4 with a shrinkage fit or other method. Preferably, the rotor disks 624a and 624b are made of a material having a high coefficient of thermal expansion, such as copper or aluminum. A thermally conductive grease, a molding member, or the like may be inserted in the gaps between the rotor disks 624a, 624b and the end surfaces of the end rings 615, respectively, so as to fill in the gaps.

The rotating motor 600 of the present embodiment yields the same advantages as obtained from the rotating motor 100 of the first embodiment. In addition, the temperature of the bearings 5a and 5b can be lowered further, since heat transmitted from the rotor 603 to the bearings 5a and 5b via the rotating shaft 4 can be impeded by the rotor disks 624a and 624b.

Since the rotor disks 624a and 624b which are separate components, are designed to be mounted on the rotating shaft 4 during assembly, the components of the rotor 603, excluding the rotor disks 624a and 624b, can be made common to every rotating motor. Only the specifications of the rotor disks 624a and 624b need be varied according to the rated load of the rotating motor 600. Hence, the productivity can be enhanced.

Figure 13:
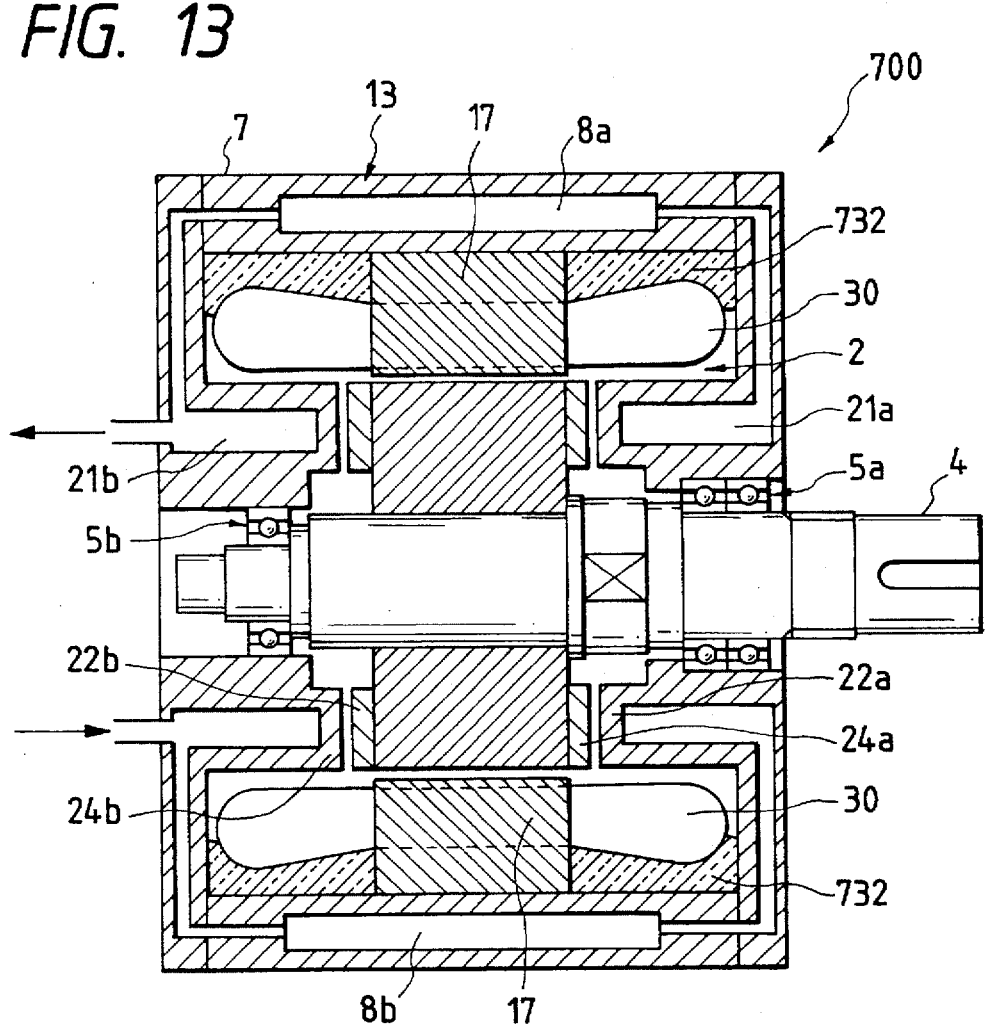
FIG. 13 is a vertical cross section of a still a further rotating motor according to the invention, showing the whole structure.

A yet further rotating motor according to the invention will be described by referring to FIG. 13. This embodiment is similar to the six embodiments described already except that the stator is mounted with a molding member. The rotating motor of the present embodiment is generally indicated by reference numeral 700 in FIG. 13. This rotating motor 700 is similar to the rotating motor 100 of the first-mentioned motor, except that the stator core 17 and the stator winding 30 mounted in the stator 2 are integrally encased in the molding member 732, and the molding member 732 fills in the space between the outer surface of the stator 2 and the inner surface of the motor housing 7. The molding member 732 is made of a material having a high coefficient of thermal expansion, such as a thermally conductive resin. After the motor housing 7, the stator core 17, and the stator winding 30 are placed in position, the material of the molding member is injected into molding dies (not shown) and cured. As a result, these components are bonded together.

The present embodiment yields the same advantages as produced by the first-mentioned embodiment. In addition, transfer of heat produced by the stator winding 30 to the motor housing 7 can be enhanced further. Therefore, the heat-dissipating effect of the stator-cooling mechanism 13 can be improved further.

In the seven embodiments described above, the bearings 5a and 5b are ball bearings using balls 20. The bearings are not limited to this construction. Other well-known bearings, such as sliding bearings, may also be used with similar utility.

Also, in the seven embodiments described above, the cooling disks and rotor disks are shaped like coaxial rings. Such a coaxial ring may be split into plural parts. That is, each disk may be composed of split coaxial members. Also, in this case, the same advantages can be derived.

Furthermore, in the seven embodiments described above, the entrance pipe 26 into which the coolant 10 is supplied is mounted in the cooling passages of the rotor-cooling mechanisms, so that the coolest coolant is supplied into the rotor-cooling mechanisms, thus forcedly cooling the rotor. Supply ports through which the coolant 10 is supplied may be formed in the outer surface-cooling passages 8a and 8b in the stator-cooling mechanisms 13.

In this case, the coolant 10 first cools down the stator 2 in the outer surface-cooling passages 8a and 8b and then is supplied into the bearing-cooling passages in the rotor-cooling mechanisms mounted in the end brackets 14a and 14b, respectively. Therefore, the bearings 5a and 5b, especially their outer races, are prevented from being overcooled. This assures that the radial gaps between the inner races 18 and the outer races 19 of the bearings 5a and 5b are prevented from decreasing.

A motor-driven vehicle forming an additional embodiment of the invention and equipped with a rotating motor next will be described by referring to FIG. 14. This motor-driven vehicle consists of an electric vehicle, for example.

Figure 14:
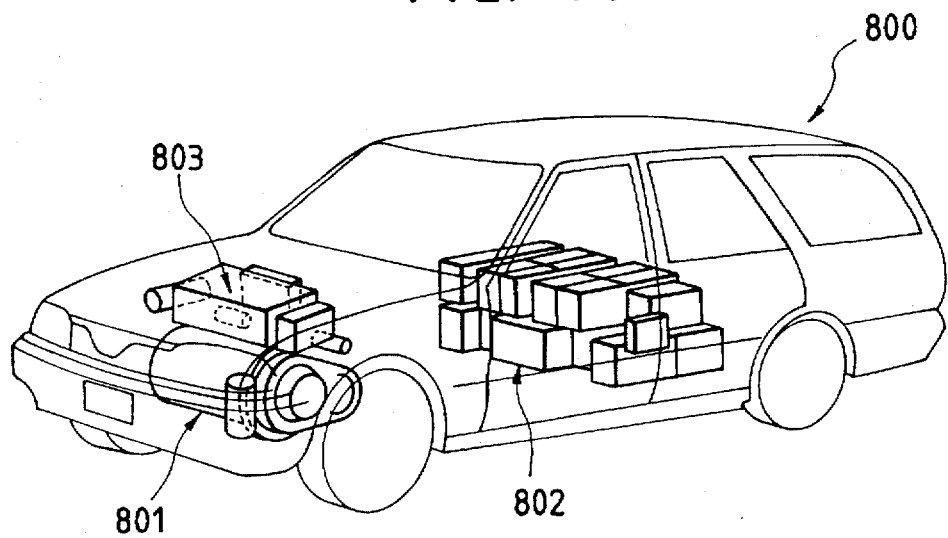
FIG. 14 is a vertical cross section of an additional rotating motor according to the invention, showing the whole structure.

The construction of this electric vehicle is schematically shown in FIG. 14, where the vehicle is generally indicated by reference numeral 800. This electric vehicle 800 has an electric motor 801 for driving the front wheels via a reduction gearset, a battery 802 for supplying electric power to the motor 801, and a controller 803.

Any one of the rotating motors 100-700 of the above-described seven embodiments be used as the motor 801. The battery 802 consists of a plurality of sealed type lead-acid batteries which do not need water retention.

The controller 803 has four major controlling functions: (1) a vehicle operating characteristic-controlling function for calculating target operating characteristics in response to a driver's operation; (2) a motor-controlling function for performing calculations to accomplish a target torque value according to the results of the calculations; (3) a power head function for controlling the current fed into the motor 801; and (4) a battery-controlling function for charging and discharging the battery 802.

The electric vehicle 800 of the present invention is constructed as described above. This vehicle uses any one of the rotating motors 100-700 of the seven embodiments as the motor 801, the motors 100-700, being characterized in that they are small in size, lightweight, and have high reliability. Consequently, the reliability of the motor-driven vehicle can also be enhanced.

Various embodiments of the present invention have been described thus far. In the present invention, heat is efficiently dissipated by rotor-cooling mechanisms. Hence, the rotor is prevented from overheating; otherwise the strength of the material of the rotor would deteriorate. In this case, the strengths of the iron core and the conductors, as they rotate, would be deteriorated. Also, the insulation would be deteriorated. Furthermore, bearings which are thermally in communication with the rotor via the rotating shaft can be prevented from overheating. Therefore, the life of the bearings is prevented from being shortened. Also, sticking and other undesirable phenomena can be prevented. Consequently, small-sized lightweight rotating motors having high reliability and high efficiency can be provided.

The vertical cross-sectional shapes of the cooling surfaces of the cooling disks and of the cooled surfaces of the rotor disks taken in the direction of the axis of rotation are protruding and recessed portions which are opposite to each other. This increases the heat transfer area, thus improving the cooling effect further. Where the protruding and recessed portions are shaped like saw-toothed forms opposite to each other, greater allowances are given to displacements of the rotor in the direction of the axis of rotation and in the radial direction. As a consequence, the machine is regulated against displacements of the rotor.

What is claimed is:

1. A rotating motor comprising:

a rotating shaft having an outer surface and capable of rotating about an axis of rotation;

a rotor fixedly mounted on the outer surface of said rotating shaft and having an outer surface and a winding, said rotor having opposite ends extending in a direction of the axis of rotation;

a stator disposed around said rotor and having a winding;

a frame to which the outer surface of said stator is mounted;

end brackets mounted on said frame to form a case in which said rotor and said stator are housed and by which both ends of said rotating shafts are rotatably held via bearings;

stator-cooling mechanisms provided with coolant passages for cooling said stator; and rotor-cooling mechanisms disposed close to at least one of said opposite ends of said rotor and provided with coolant passages for cooling said motor, wherein on at least one of said opposite ends of said rotor taken in the direction of the axis of rotation there are provided substantially annular rotor disks to be cooled, wherein said rotor-cooling mechanisms are equipped with substantially annular cooling disks spaced apart from and disposed opposite to said rotor disks in the direction of the axis of rotation, and wherein said coolant passages are provided in said cooling disks.

2. The rotating motor of claim 1, wherein vertical cross-sectional shapes of the cooling surfaces of said cooling disks and of the cooled surfaces of said rotor disks taken in the direction of the axis of rotation are formed by protruding and recessed portions which are disposed opposite to each other.

3. The rotating motor of claim 1, wherein vertical cross-sectional shapes of the cooling surfaces of said cooling disks and of the cooled surfaces of said rotor disks taken in the direction of the axis of rotation are formed by substantially saw-toothed portions which are disposed opposite to each other.

4. The rotating motor of claim 1, wherein the coolant passages in said stator-cooling mechanisms and the coolant passages in said rotor-cooling mechanisms are connected to each other and permit a common coolant to flow therethrough.

5. A rotating motor comprising:

a rotating shaft having an outer surface and capable of rotating about an axis of rotation;

a rotor fixedly mounted on the outer surface of said rotating shaft and having an outer surface and a winding, said rotor having opposite ends extending in a direction of the axis of rotation;

a stator disposed around said rotor and having a winding;

a frame to which the outer surface of said stator is mounted;

end brackets mounted on said frame to form a case in which said rotor and said stator are housed and by which both ends of said rotating shafts are rotatably held via bearings;

stator-cooling mechanisms provided with coolant passages for cooling said stator;

bearing-cooling mechanisms mounted in said end brackets and provided with coolant passages for cooling said bearings; and rotor-cooling mechanisms disposed close to at least one of said opposite ends of said rotor and provided with coolant passages for cooling said motor, wherein on at least one of said opposite ends of said rotor taken in the direction of the axis of rotation there are provided substantially annular rotor disks to be cooled, wherein said rotor-cooling mechanisms are equipped with substantially annular cooling disks spaced apart from and disposed opposite to said rotor disks in the direction of the axis of rotation, and wherein said coolant passages are provided in said cooling disks.

6. The rotating motor of claim 5, wherein the coolant passages in said stator-cooling mechanisms, the coolant passages in said bearing-cooling mechanisms, and the coolant passages in said rotor-cooling mechanisms are connected to each other and permit a common coolant to flow therethrough.

7. The rotating motor of claim 2, wherein vertical cross-sectional shapes of the cooling surfaces of said cooling disks and of the cooled surfaces of said rotor disks taken in the direction of the axis of rotation are protruded and recessed portions which are opposite to each other.

8. The rotating motor of claim 2, wherein vertical cross-sectional shapes of the cooling surfaces of said cooling disks and of the cooled surfaces of said rotor disks taken in the direction of the axis of rotation are substantially saw-toothed portions which are opposite to each other.

9. A rotary motor comprising:

a rotary shaft on which is fixedly mounted a rotor having a winding;

a stator disposed around said rotor having a winding;

first and second end brackets by which the respective ends of said rotary shaft are supported for rotation around an axis of rotation via bearings;

a cylindrical housing forming with said first and second end brackets a case in which said rotor and stator are housed, said stator being mounted on an inner surface of said housing;

substantially annular first cooling disks provided on the opposite ends of said rotor taken in the direction of said axis of rotation;

substantially annular second cooling disks provided on said first and second end brackets in opposing, closely spaced relationship to said first cooling disks;

a first bracket cooling passage formed in said first end bracket, and having a cooling fluid entrance for introduction of cooling fluid, for cooling one of said bearings and at least a part of the second cooling disk provided in said first end bracket;

a first housing cooling passage formed in said cylindrical housing, and being connected at one end to said first bracket cooling passage, for cooling at least part of said stator;

a second bracket cooling passage formed in said second end bracket, and being connected to the other end of said first housing cooling passage, for cooling one of said bearings and the second cooling disk provided in said second end bracket;

a second housing cooling passage formed in said cylindrical housing, and being connected at one end to said second bracket cooling passage, for cooling at least part of said stator; and a third bracket cooling passage formed in said end bracket, and being connected to the other end of said second housing cooling passage and having a cooling fluid outlet, for cooling one of said bearings and at least a part of the second cooling disk provided in said first end bracket;

whereby cooling fluid may flow on a path through said first bracket cooling passage, said first housing cooling passage, said second bracket cooling passage, said second housing cooling passage and said third bracket cooling passage to cause heat to be efficiently dissipated from all of stator, rotor and bearings.

10. A rotary motor according to claim 9, wherein each of said first and second housing cooling passages takes a zigzag course so as to extend for substantially a half revolution around said axis of rotation.

11. The rotary motor according to claim 9, wherein said first cooling disks are mounted in end rings of said rotor.

12. The rotary motor according to claim 9, wherein said first cooling disks are formed integrally with end rings of said rotor.

13. The rotary motor according to claim 9, wherein said first cooling disks are firmly mounted to end rings of said rotor.

14. The rotary motor according to claim 9, wherein vertical cross-sectional shapes of the cooling surfaces of said first cooling disks and of the cooled surfaces of said second cooling disks taken in the direction of the axis of rotation are formed by protruding and recessed portions which are disposed opposite to each other.

15. The rotary motor according to claim 9, wherein vertical cross-sectional shapes of the cooling surfaces of said first cooling disks and of the cooled surfaces of said second cooling disks taken in the direction of the axis of rotation are formed by substantially saw-toothed portions which are disposed opposite to each other.

16. The rotary motor according to claim 9, wherein said first cooling disks and said second cooling disks are made of a metal having a high coefficient of thermal expansion.

17. The rotary motor according to claim 16, wherein said material having a high coefficient of thermal expansion includes at least one of aluminum and copper.

18. The rotary motor according to claim 9, wherein an iron core included in said stator and said winding of said stator are integrally encased in a molding member that fills a space between the outer surface of said stator and the inner surface of said housing.

19. The rotary motor according to claim 18, wherein said molding member is made of a material having a high coefficient of thermal expansion.

* * * * *